United States Patent [19]

Oakes et al.

[11] Patent Number: 5,133,950
[45] Date of Patent: * Jul. 28, 1992

[54] REDUCING $N_2O$ EMISSIONS WHEN BURNING NITROGEN-CONTAINING FUELS IN FLUIDIZED BED REACTORS

[75] Inventors: Eric J. Oakes, Del Mar; Lee Y. Yam, San Diego, both of Calif.; Matti A. Hiltunen, Karhula, Finland

[73] Assignee: A. Ahlstrom Corporation, Karhula, Finland

[*] Notice: The portion of the term of this patent subsequent to Aug. 27, 2008 has been disclaimed.

[21] Appl. No.: 694,206

[22] Filed: May 3, 1991

Related U.S. Application Data

[63] Continuation-in-part of Ser. No. 509,373, Apr. 17, 1990, Pat. No. 5,043,150.

[51] Int. Cl.⁵ .................. B01J 8/00; C01B 21/00
[52] U.S. Cl. ................................................ 423/239
[58] Field of Search ........................ 423/239, 239 A

[56] References Cited

U.S. PATENT DOCUMENTS

| | | | |
|---|---|---|---|
| 2,910,343 | 10/1959 | Childers et al. | 423/239 |
| 3,125,408 | 3/1964 | Childers et al. | 423/239 |
| 4,117,081 | 9/1978 | Inaba et al. | 423/239 |
| 4,609,536 | 9/1986 | Yoon et al. | 423/244 |
| 5,043,150 | 8/1991 | Hiltunen et al. | 423/239 |

FOREIGN PATENT DOCUMENTS

| | | |
|---|---|---|
| 3332663 | 2/1987 | Fed. Rep. of Germany . |
| 3736912 | 5/1988 | Fed. Rep. of Germany . |
| 406185 | 1/1991 | Fed. Rep. of Germany . |

OTHER PUBLICATIONS

Kramlich et al, "Mechanisms of Nitrous Oxide Formation in Coal Flames", Combustion and Flame 77:375–384 (1989); Elsevier Science Publishing Co., Inc., New York.

Primary Examiner—Gregory A. Heller
Attorney, Agent, or Firm—Nixon & Vanderhye

[57] ABSTRACT

The amount of $N_2O$ emission from a fluidized bed reactor is reduced by adding a hydrogen radical providing additive (e.g. a hydrogen containing fuel such as natural gas or alcohol) to the flue gases discharged from the fluidized bed. Sufficient exygen is present in the flue gases—either by addition with the additive, or by addition of an excess to the combustion chamber—so that the additive reacts with the oxygen, typically raising the temperature of the flue gases (e.g. from about 700°–900° C. to about 950°–1100° C.) so that $N_2O$ production is reduced about 10–90%. The additive may be injected in or just prior to a cyclone for separating particles from the flue gases, in a gas discharge immediately after the cyclone (e.g. just downstream of a heat exchanger for cooling the flue gases and flattening the velocity profile of the flue gases), just prior to a superheater of a convection section, or in a combustion chamber just prior to a gas turbine.

13 Claims, 2 Drawing Sheets

REDUCING N₂O EMISSIONS WHEN BURNING NITROGEN-CONTAINING FUELS IN FLUIDIZED BED REACTORS

CROSS-REFERENCE TO RELATED APPLICATION

This application is a continuation-in-part of co-pending application Ser. No. 07/509,373 filed Apr. 17, 1990, now U.S. Pat. No. 5,043,150.

BACKGROUND AND SUMMARY OF THE INVENTION

The present invention relates to a method (and apparatus) for reducing the emissions of nitrous oxides $N_2O$ to the atmosphere from the combustion of nitrogen containing fuels or other nitrogen containing combustible compounds. More particularly, this invention relates to a method and apparatus for reducing such emissions when combusting solid fuels or the like in fluidized bed reactors.

As is well known, oxides of nitrogen are expelled to the air mainly from traffic, energy production (e.g. coal combustion), and waste management. Various oxides of nitrogen are produced during the combustion of most fuels with air. These nitrogen oxides result either from the oxidation of nitrogen in the air itself at elevated temperatures of combustion or from the oxidation of nitrogen contained in the fuel.

Numerous attempts have been made to develop methods which reduce the nitrogen oxide emissions in furnaces. The efforts have especially been towards the reduction of nitrogen dioxide ($NO_2$) emissions in flue gases.

Another oxide, nitrous oxide $N_2O$, has recently been discovered to be one of the "greenhouse effect gases" that is increasing in the atmosphere and may contribute to global warming. When oxidizing in the upper tropospherical layers nitrous oxides ($N_2O$) generate nitric oxide NO which is considered to be one of the most important air pollutants:

$$N_2O + h\nu = N_2 + O$$

$$N_2O + O = 2NO$$

Nitric oxide has a similar effect on the climate as carbon dioxide, potentially increasing the temperature and destroying the ozone layer.

It has been reported that $N_2O$ emissions are generated in higher degree in combustors with relatively low combustion temperatures such as 750°–900° C. At higher temperatures the formation of $N_2O$ does not seem to be a problem, as the formation of $N_2O$ is slow and the reduction of $N_2O$ to $N_2$ is high.

Fluidized bed combustors operate at temperature ranges more favorable for $N_2O$ formation, than most other types of combustors. $N_2O$ emissions from circulating and bubbling fluidized bed boilers may be on the level of 50–200 ppm, higher than desired. The object of this invention is, therefore, to provide a method of reducing the emission of $N_2O$ both from atmospheric and pressurized circulating or bubbling fluidized bed boilers.

The invention is based on the understanding of the kinetics of the formation and destruction of $N_2O$. It has been suggested, that HCN, which can be formed from volatile nitrogen or char nitrogen, is the major precursor of $N_2O$ formation in combustors, and that $N_2O$ reduction is strongly dependent on the temperature or H radical concentration. The increase in temperature or H radical concentration promotes $N_2O$ reduction via the reaction $$N_2O + H \rightarrow N_2 + OH.$$

Kramlich et al (Combustion and Flame 77:p.375–384, 1989) have made experiments in order to study the $N_2O$ formation and destruction in a tunnel furnace which was fired on either natural gas or oil. Nitrogen-containing compounds, such as HCN and acetonitrile, were doped into the flow. According to Kramlich et al maximum $N_2O$ emissions of about 245 ppm occurred at 977°–1027° C. for HCN addition and of about 150 ppm at 1127°–1177° C. for acetonitrile addition. The study also showed that $N_2O$ concentration was reduced from 240 ppm to 10 ppm by increasing the tunnel furnace temperature to over 1200° C. during HCN injection into the furnace or to over 1300° C. during acetonitrile injection, i.e. relatively high temperatures were needed according to this study.

Kramlich et al also studied the influence of $NO_x$ control on $N_2O$ emissions. Especially the reburning of a portion of the fuel by fuel staging in the tunnel furnace was studied. In reburning, a portion of the fuel is injected after the main flame zone, which drives the overall stoichiometry to a fuel-rich value. After a certain time in the fuel-rich zone, air is added to fully burn out any remaining fuel. Kramlich et al discovered that reburning of coal in a second stage increases $N_2O$ emissions whereas reburning of natural gas in the furnace exerts an opposite influence to that of coal and destroys $N_2O$.

It is an object of the present invention to provide a simple and economical method and apparatus for the reduction of $N_2O$ emissions from atmospheric and pressurized circulating and bubbling fluidized bed boilers.

It is further an object of the present invention to provide a method and apparatus for creating favorable conditions for the destruction of nitrous oxides $N_2O$ contained in flue gases discharged from fluidized bed combustors.

It is still further an object of the present invention to provide a method for reduction of $N_2O$ in flue gases which can easily be retrofitted into existing fluidized bed combustion systems without interfering with existing processes.

In accordance with the present invention there is provided a method of reducing emissions of $N_2O$ in flue gases from the combustion of nitrogen containing fuels in a fluidized bed reactor. A first combustion stage is arranged in a fluidized bed of particles. Fuel and an excess of an oxygen-containing gas at an air coefficient $>1$ may be introduced into a first combustion stage for combustion of the fuel (i.e. oxygen-containing gas may be injected into the first combustion stage in an amount to generate flue gases containing residual oxygen). A temperature of about 700° C.–900° C. is maintained in the first combustion stage. The flue gases containing residual oxygen are conveyed from the first combustion stage into a flue gas passage. An additive selected from a group of chemical compounds able to form hydrogen (H) radicals is injected into the flue gas passage in order to generate sufficient quantities of hydrogen radicals to promote the reduction of $N_2O$ in the flue gases. Preferably the additive injected is combusted to provide combustion heat for raising the temperature of the flue gas passage to >900° C., preferably to about 950°-1100° C. The group of additives able to form hydrogen radicals comprise compounds such as alcohol or natural gas, or other hydrocarbon gases such as liquefied petroleum gas or gasifier or pyrolyser gas, or oil. A good mixing between the flue gas and the formed hydrogen radicals is provided by injecting the additive at a location where a good mixing is easily arranged or is already prevailing in the flue gas flow. Good mixing facilitates the reactions between $N_2O$ and H radicals. The amount of additive injected is adapted to the amount of $N_2O$ in the flue gases.

The present invention is especially applicable when combusting solid fuels or waste materials in fluidized bed combustors at temperatures below 900° C. The solid fuel or waste is introduced into the fluidized bed where—due to good mixing with the fluidized particles—it almost immediately reaches the bed temperature and is combusted. Temperatures in fluidized beds are normally between 700°-900° C. which gives optimal conditions for the combustion itself and, e.g., sulphur reduction in the flue gases. NO formation is low due to the relatively low combustion temperature, but $N_2O$ may be formed.

In circulating fluidized beds the velocity of the fluidizing air is high enough to entrain a considerable amount of the bed particles out from the combustion chamber with the flue gases. The particles entrained are separated from the flue gases and recycled to the combustion chamber through a recycling duct. The circulation of particles from the combustion chamber through the particle recycling path back to the combustion chamber brings about a uniform temperature in the entire system which leads to more efficient combustion and longer residence times in the system as well as improved sulphur capture from flue gases.

Unfortunately $N_2O$ formation seems to be facilitated by the low temperatures used in both bubbling and circulating fluidized beds. According to the present invention the $N_2O$ concentration in the flue gases can be decreased by the injection of an additive capable for forming hydrogen radicals at the flue gas temperature and/or by slightly increasing the temperature of the flue gases.

The types of additives (e.g. additional fuels) which can be injected into the flue gas flow in order to reduce $N_2O$ concentration include:
natural gas or methane,
liquefied petroleum gas,
oil,
alcohol, e.g. methanol or ethanol,
gas from a pyrolyser or gasifier, or
any gaseous, liquid or solid fuel, having a hydrogen component, and a heat value of at least 1 MJ/kg.

Gases may be introduced through gas inlet nozzles without any carrier medium, or with an oxygen containing gas. Oil or fine solid fuel may be introduced with carrier gas such as air or recycled flue gas.

The additives injected into the flue gases are preferably injected at a location separate from the first combustion stage in order not to interfere with reactions taking place there. Preferably the additives should not be injected so that they significantly increase the temperature of the fluidized bed particles.

In order to ensure effective reduction of $N_2O$ the additive should be injected at a location where the whole flue gas flow can easily be affected by the introduction of the additive. The temperature of the whole flue gas flow should be increased and/or hydrogen radicals formed should come into contact with the whole flue gas flow in order to achieve a maximum reduction of $N_2O$.

The additive or additional fuel may be injected into the following locations:
a section of the fluidized bed combustor, or elsewhere, where bed density is less than 200 kg/m³,
a duct between the combustion chamber and a cyclone or other gas particle separator,
a cyclone or other gas particle separator itself, in any number of configurations,
ducts between two cyclones or other gas particle separators, or combination thereof connected in series,
any location in the backpass after the combustor and before a stack or gas turbine, or
any external postcombustor for $N_2O$ reduction.

By introducing additional fuel, such as natural gas, in the flue gas passage in front of the convection section where the temperature of the flue gas still is high, only a relatively small amount of additional fuel is needed to increase the temperature of the flue gas flow to over 900° C.

A cyclone separator may provide very good mixing of flue gases and any additive introduced therein. It may, however, be more preferable to increase the temperature of the flue gases at a location downstream of the particle separator (at least in circulating fluidized bed systems) in order not to increase the temperature of fluidized bed particles and interfere negatively with sulphur capture (which is optimal at lower temperatures).

The introduction of additional fuel into the flue gases may be advantageously used to increase the temperature of the flue gases upstream of superheaters, thereby ensuring sufficient heating capacity. The fuel may be added into a convention section immediately before the superheaters. The introduction of combustible additives may also be used to simultaneously increase the temperature of gas in a combustion chamber or so called topping combustor connected to a gas turbine.

When additional fuel is introduced into the flue gas flow before the convection section, the temperature of the flue gas has to be only moderately increased from temperatures of about 700°-900° C. to temperatures of about 910°-1100° C., i.e. a temperature increase of about only 10°-250° C. is enough, because of the presence of particles (e.g. calcined limestone) from the fluidized bed. If the flue gases pass through a convection section, their temperature is substantially reduced. Therefore, if the $N_2O$ reduction is performed after the convection section, the temperature of the flue gases must be raised about 200°-700° C. in order to get it into the 910°-1100° C. range. Therefore, the amount of fuel necessarily added after a convection section is greater than the amount necessary before a convection section.

By using this process according to the invention to increase temperature and/or H radical concentration in the flue gases it may be possible to reduce the total amount of $N_2O$ by 10-99%, normally about 50%, and preferably about 50-90%. The mass flow of the additive is defined by the percentage of $N_2O$ reduction required and the initial concentration of $N_2O$.

In addition to the additive (e.g. additional fuel) injected, a suitable amount of oxidizing agent may in some cases be injected into the $N_2O$-containing flue gas before, at the same location, or after fuel injection point to guarantee efficient firing.

The present invention provides a method, which brings about conditions favorable to reduction of $N_2O$ in flue gases in fluidized bed combustors, and thus a simple way of reducing $N_2O$ emissions in flue gases. The new method can easily be utilized in existing fluidized bed reactor systems by introducing an additive into flue gas ducts, before stack or gas turbines or into external postcombustors. There is no need to interfere with the primary combustion process or the reactions taking place in the combustion chamber itself. Surprisingly, only a very slight increase in temperature may be needed for the reduction of $N_2O$ in the flue gases. Prior art studies indicate destruction of $N_2O$ in the furnace itself and at much higher temperatures. The increased temperature helps to promote destruction of $N_2O$ not only by H-radicals in the gas phase but also the heterogenous reaction between $N_2O$ and calcined limestone. Prior art studies show that $N_2O$ formation reaches a maximum at the very temperatures at which $N_2O$ is destroyed according to the present invention.

BRIEF DESCRIPTION OF THE DRAWINGS

The invention is explained below in more detail by reference to illustrative embodiments represented in the drawings in which.

DETAILED DESCRIPTION OF THE DRAWINGS

Figure 1:
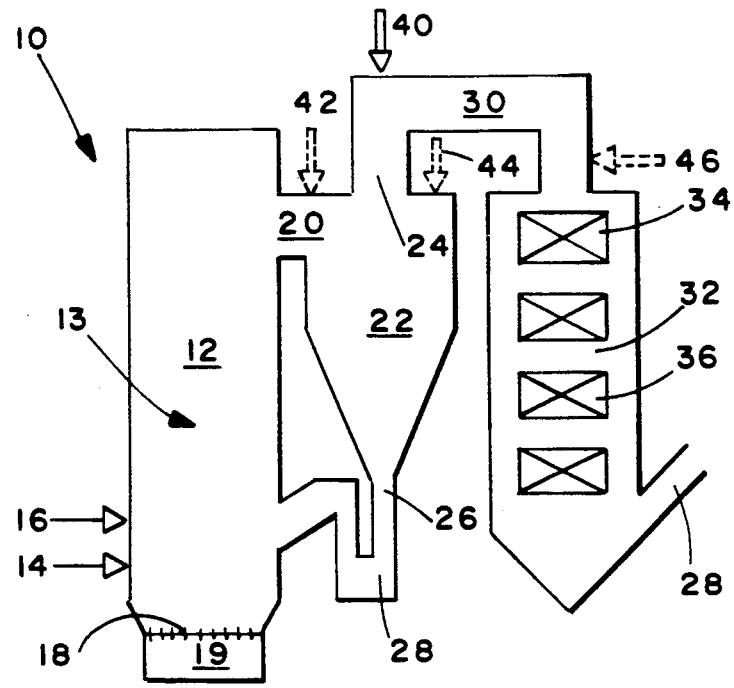
FIG. 1 is a schematic drawing of an exemplary circulating fluidized bed system for reducing $N_2O$ in accordance with the present invention.

A preferred embodiment of the present invention is shown in FIG. 1, where solid material is combusted in a circulating fluidized bed reactor 10. The reactor includes a combustion chamber 12 containing a fluidized bed of particles 13 with inlets 14, 16 for solid fuel material, and typically other solid material such as lime or limestone for the reduction of $SO_2$ in flue gases. Fluidizing air is led into the combustion chamber through a bottom plate 18 from a windbox 19. The air is lead into the reactor at nearly an atmospheric pressure at a flow rate high enough to fluidize the bed and entrain a portion of the solid particles.

The combustion chamber has an outlet 20 for flue gases containing entrained solid particles. The flue gases are led to a cyclone separator 22 where solid bed particles are separated from the gases. The cleaned gas is discharged through a gas outlet opening duct 24 and the particles separated from the gas are led downwards through a vertical return duct 26 back into the lower part of the combustion chamber. The return duct forms a bend 28 at its lower end in front of the inlet to the combustion chamber.

The cleaned gas is led via the gas outlet opening 24 into a gas passage 30 which connects the fluidized bed reactor with a convection section 32. A superheater 34 is arranged in the gas inlet zone of the convection section and other heat transfer surfaces 36, downstream from the superheater. Gas outlet 38 is arranged in the bottom part of the convection section.

An additive inlet 40 for hydrogen radical providing additive is arranged in the gas passage 30 connecting the cyclone with the convention section. The inlet for additive is disposed in the gas passage at a location close to the cyclone gas outlet opening 24.

In operation, combustion is effected in a first combustion stage in the combustion chamber at a relatively low temperature (e.g. when combusting coal at about 850° C.). At this temperature a low $No_2$ combustion is achieved and a maximum sulphur capture with lime occurs. Flue gases containing residual oxygen and $N_2O$ and entrained bed particles are discharged through the gas outlet 20 into the cyclone 22. Bed particles containing unreacted lime for sulphur capture are separated from the flue gases in the cyclone and recycled into the combustion chamber.

An additive, such as natural gas, is injected into the still-hot flue gas, e.g. in the duct 30 through the additive inlet 40 (immediately after cyclone 22). The natural gas to some extent provides hydrogen radicals already at the flue gas temperature, but due to the residual oxygen content in the flue gases natural gas is combusted when entering the flue gas passage 30, thus increasing the flue gas temperature in the flue gas passage to a still more favorable level when considering hydrogen radical formation and $N_2O$ reduction to $N_2$. Alternatively, or additionally, $O_2$ containing gas may be added in inlet 40 mixed with the additive.

The introduction of additive may additionally or alternatively be accomplished through an inlet 42, shown as a broken line in FIG. 1, in the short duct 21 connecting the combustion chamber 12 and the cyclone 22. This inlet 42 may be used especially if the particle content of the flue gases discharged from the combustion chamber, is small. It is further possible to arrange an additive inlet 44 directly into the cyclone 22, into a particle lean zone. The advantage of this arrangement is inherently good mixing between flue gases and introduced additive in the gas vortex in the cyclone.

The additive may also or alternatively be injected into the convention section through an inlet 46 arranged immediately upstream of the superheater 34. This arrangement is advantageous if there are problems in getting enough superheating steam.

Figure 2:
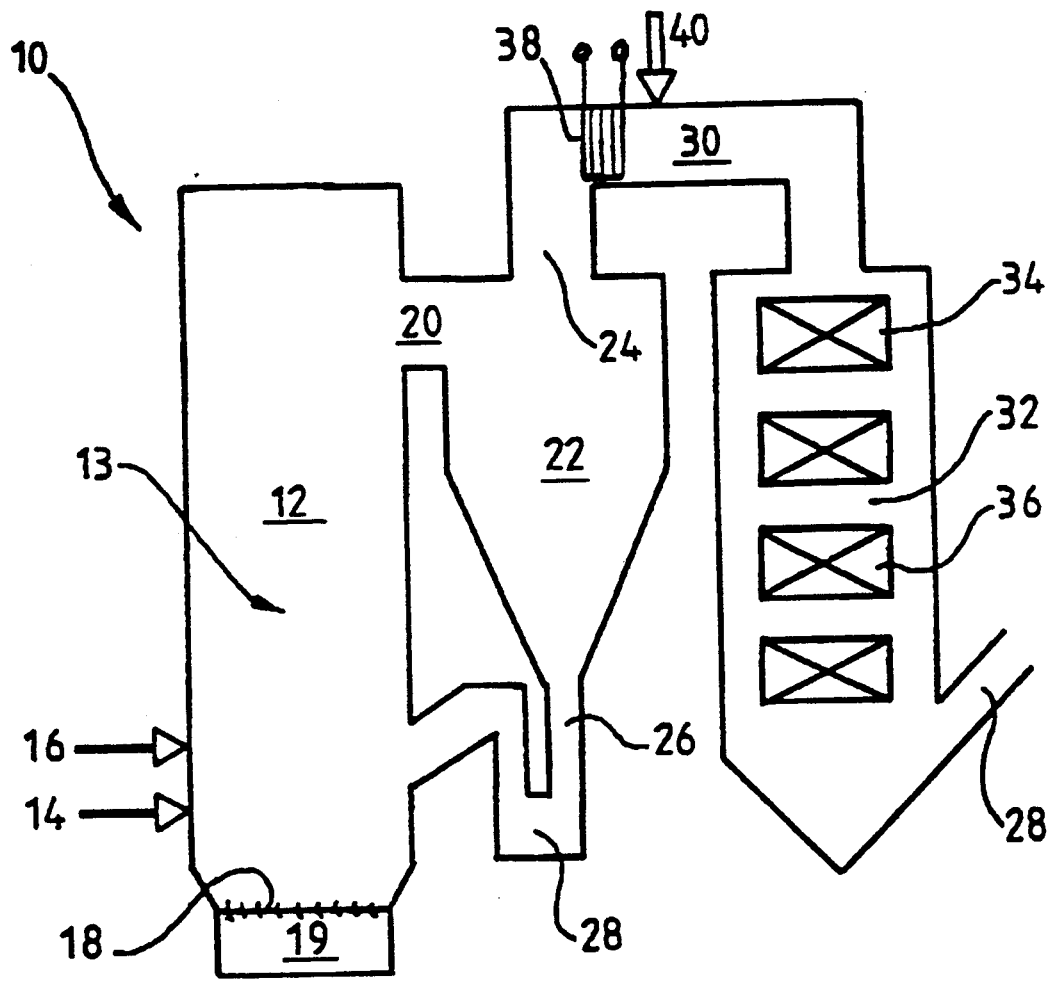
FIG. 2 is a schematic drawing of another exemplary embodiment.

Another embodiment of the present invention is shown in FIG. 2. In this embodiment heat exchange tubes 38, e.g. a few rows of screen tubes, are disposed in a gas duct 30 after a cyclone, but before the duct enlargens into a convection section 32.

An optimal location for an additive inlet 40 seems often to be immediately after the screen tubes 38. Normally the screen tubes are water cooled, but can in some applications be steam or air cooled. High temperatures in the gas duct can cause problems if the tubes are air or steam cooled. The water tubes can be connected to other water/steam systems, e.g. the cooling system of a cooled cyclone, in the fluidized bed reactor. If air cooled tubes are used, the heated air can be used as combustion air. The heated air can also be used to inject hydrogen radical providing additive into the gas duct.

A heat exchanger arranged upstreams of the injection of hydrogen radical providing additive is advantageous for flattening the gas velocity profile in the gas duct. This is useful because the flue gas from the cyclone exit may have a skewed velocity profile.

The heat exchanger is further useful to control the flue gas temperature so that the additive is injected at the optimum temperature for maximum effectiveness. With the heat exchanger the temperature can be regulated to an optimal level. For each additive there is an optimal temperature for maximum efficiency.

Figure 3:
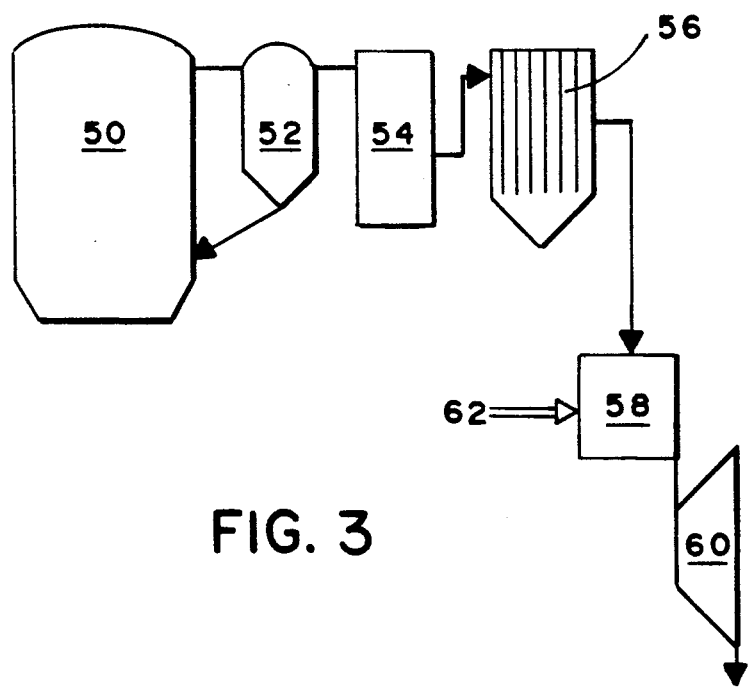
FIG. 3 is a schematic drawing of still another exemplary embodiment.

Another embodiment of the present invention is shown in FIG. 3, where solid material is combusted in a pressurized circulating fluidized bed reactor 50. The pressurized flue gas is led through a cyclone 52, for separating particles from the gas, and a convection section 54 into a particle filter 56 for cleaning the pressurized flue gases. The cleaned flue gas is led into a combustion chamber 58 immediately upstream of a gas turbine 60, where the flue gas is expanded. In the combustion chamber 58 reduction of $N_2O$ is accomplished by introducing additional fuel into the flue gas through inlet 62 and combusting the fuel to simultaneously increase the temperature of the flue gas.

In all embodiments it is necessary to adjust the amount of additive (and oxygen) introduced depending upon the type of additive, fuel, fluidized bed reactor, position of injection, and a wide variety of other factors.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of reducing the emissions of $N_2O$ in flue gases from the combustion of nitrogen containing fuel in a fluidized bed reactor which has a first combustion stage with a fluidized bed of particles, a particle separator for separating particles from the flue gases discharged by the first combustion stage, a convection section downstream of the particle separator and a flue gas passage from the particle separator to the convection section, comprising the steps of continuously:
   (a) supplying nitrogen containing fuel and an oxygen containing gas for combustion of the fuel into the first combustion stage of the reactor;
   (b) maintaining a temperature of about 700° C.-900° C. in the first combustion stage;
   (c) discharging flue gases, containing particles, from the first combustion stage;
   (d) separating out the majority of particles from the flue gases with the particle separator, and discharging flue gases from the particle separator into the convention section;
   (e) controlling the temperature of flue gases exiting the separator and entering the gas passage in a temperature controlling section;
   (f) adding to the discharged flue gases, just downstream of the temperature controlling section, a hydrogen radical providing additive capable of forming hydrogen radicals at temperatures equal to or higher than those of the flue gases just downstream of the temperature controlling section in order to generate sufficient quantities of hydrogen radicals to promote a reduction of $N_2O$ in the flue gases; and
   (g) effecting good mixing of the added hydrogen radicals and flue gases to facilitate $N_2O$ reduction.

2. A method as recited in claim 1 comprising the further step (h) of supplying oxygen containing gas to the discharged flue gases.

3. A method as recited in claim 1 wherein steps (e) is practiced to lower the temperature of the flue gases to an optimum temperature for maximum effectiveness of the particular hydrogen radical added in step (f).

4. A method as recited in claim 1 wherein step (f) is practiced where the particle density of the flue gases is less than 200 kg/m$^3$.

5. A method as recited in claim 1 comprising the further step (i) of flattening the gas velocity profile of flue gases exiting the separator and entering the gas passage prior to step (f).

6. A method as recited in claim 5 wherein steps (e) and (i) are practiced by placing a heat exchanger in the gas passage.

7. A method as recited in claim 6 comprising the further steps of passing oxygen containing gas through the heat exchanger to cool the flue gases by transfer of heat from the flue gases to the oxygen containing gas; and using the heated oxygen containing gas as the oxygen containing gas in the practice of step (a).

8. A method as recited in claim 6 comprising the further steps of passing oxygen containing gas through the heat exchanger to cool the flue gases by transfer of heat from the flue gases to the oxygen containing gas; and adding the heated oxygen containing gas with the hydrogen radical in the practice of step (f).

9. A method as recited in claim 1 wherein step (f) is practiced by adding an additive selected from the group consisting essentially of methane, liquified petroleum gas, oil, alcohol, pyrolyser gas, and gasifier gas.

10. A method as recited in claim 9 wherein step (f) is practiced by adding oxygen containing gas premixed with additive.

11. A method as recited in claim 2 wherein step (h) is practiced by supplying an excess of oxygen containing gas, at an air coefficient >1, to the first combustion stage in the practice of step (a), so that there will be a residual amount of oxygen in the flue gases.

12. A method of reducing the emissions of $N_2O$ in flue gases from the combustion of nitrogen containing fuel in a fluidized bed reactor which has a first combustion stage with a fluidized bed of particles, and a particle separator for separating particles from the flue gases discharged by the first combustion stage, a convection section downstream of the particle separator and a flue gas passage from the particle separator to the convention section; comprising the steps of continuously:
   (a) supplying nitrogen containing fuel and an oxygen containing gas for combustion of the fuel into the first combustion stage of the reactor;
   (b) maintaining a temperature of about 700° C.-900° C. in the first combustion stage;
   (c) discharging flue gases, containing particles, from the first combustion stage;
   (d) separating out the majority of particles from the flue gases with the particle separator, and discharging flue gases from the particle separator into the convention section;
   (e) flattening the gas velocity profile of flue gases exiting the separator and entering the gas passage in a velocity profile flattening section;
   (f) adding to the discharged flue gases, just downstream of the velocity profile flattening section, a hydrogen radical providing additive capable of forming hydrogen radicals at temperatures equal to or higher than those of the flue gases just downstream of the velocity profile flattening section in order to generate sufficient quantities of hydrogen radicals to promote a reduction of $N_2O$ in the flue gases; and
   (g) effecting good mixing of the added hydrogen radicals and flue gases to facilitate $N_2O$ reduction.

13. A method as recited in claim 12 wherein step (e) is practiced by placing a heat exchanger in the gas passage.

* * * * *

UNITED STATES PATENT AND TRADEMARK OFFICE
CERTIFICATE OF CORRECTION

PATENT NO. : 5,133,950

DATED : July 28, 1992

INVENTOR(S) : Oakes et al

It is certified that error appears in the above-identified patent and that said Letters Patent is hereby corrected as shown below:

On the title page:

item [75], name of second inventor should read:

Yam Y. Lee

Signed and Sealed this

Fourteenth Day of June, 1994

*Attest:*

BRUCE LEHMAN

*Attesting Officer*     *Commissioner of Patents and Trademarks*